United States Patent
Ramberg et al.

(10) Patent No.: US 10,002,280 B1
(45) Date of Patent: *Jun. 19, 2018

(54) SYSTEM AND METHOD FOR CONTROLLING A SIGNAL IN A FINGERPRINT SENSING DEVICE

(71) Applicant: Fingerprint Cards AB, Göteborg (SE)

(72) Inventors: Fredrik Ramberg, Göteborg (SE); Hans Thörnblom, Kungsbacka (SE)

(73) Assignee: Fingerprint Cards AB, Göteborg (SE)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/724,603

(22) Filed: Oct. 4, 2017

(30) Foreign Application Priority Data

Dec. 21, 2016 (SE) .................... 1651700

(51) Int. Cl.
*G06K 9/00* (2006.01)
*G06F 3/044* (2006.01)
*G06F 3/041* (2006.01)

(52) U.S. Cl.
CPC ........... *G06K 9/0002* (2013.01); *G06F 3/044* (2013.01); *G06F 3/0416* (2013.01); *G06K 9/00053* (2013.01)

(58) Field of Classification Search
CPC .... G06K 9/0002; G06K 9/0008; G06K 9/036; G06F 3/03547; G06F 3/044; G01R 27/2605; G07C 9/00; G07C 9/00158
See application file for complete search history.

(56) References Cited

U.S. PATENT DOCUMENTS 6,327,376 B1* 12/2001 Harkin .................. G01B 7/004
356/71
6,636,053 B1* 10/2003 Gozzini .................. G01D 5/24
324/658
(Continued)

FOREIGN PATENT DOCUMENTS

EP 2090968 A2 8/2009
WO 2015189633 A1 12/2015

OTHER PUBLICATIONS

Swedish Search Report for Swedish Application No. 1651700-5 dated Aug. 14, 2017, 2 pages.

*Primary Examiner* — Amir Alavi
(74) *Attorney, Agent, or Firm* — RMCK Law Group PLC (57) ABSTRACT

There is provided a method for controlling a capacitive fingerprint sensing device for sensing a fingerprint pattern of a finger, the capacitive fingerprint sensor comprising a plurality of sensing elements. Each sensing element comprises a protective dielectric top layer to be touched by the finger, an electrically conductive sensing structure arranged underneath the top layer, sensing circuitry for providing an analog sensing signal indicative of a distance between the finger and the sensing structure. The fingerprint sensing device further comprises timing circuitry configured to control a timing of a drive signal, the drive signal being configured to provide a change in potential difference between the finger and the sensing structure. The method comprises forming a drive signal comprising a sequence of pulses, wherein a delay between consecutive pulses is controllable by said timing circuitry. There is also provided a sensing device configured to perform the above described method.

19 Claims, 7 Drawing Sheets

(56) References Cited

U.S. PATENT DOCUMENTS

| | | | | |
|---|---|---|---|---|
| 7,965,877 | B2 * | 6/2011 | Qi | G06K 9/0002 382/124 |
| 9,449,212 | B2 * | 9/2016 | Riedijk | G06K 9/0002 |
| 2003/0190061 | A1 * | 10/2003 | Chou | G06K 9/0002 382/124 |
| 2016/0148036 | A1 * | 5/2016 | Kim | G06K 9/0002 382/124 |
| 2016/0180619 | A1 | 6/2016 | Riedijk | |
| 2016/0239700 | A1 | 8/2016 | Yang et al. | |
| 2016/0314333 | A1 * | 10/2016 | Chiang | G06K 9/0002 |
| 2016/0379036 | A1 * | 12/2016 | Long | G06K 9/00013 382/124 |
| 2017/0024598 | A1 | 1/2017 | Chiang et al. | |
| 2017/0330013 | A1 * | 11/2017 | Ramberg | G06K 9/0002 |
| 2017/0330014 | A1 * | 11/2017 | Ramberg | G06K 9/0002 |

\* cited by examiner

SYSTEM AND METHOD FOR CONTROLLING A SIGNAL IN A FINGERPRINT SENSING DEVICE

CROSS REFERENCE TO RELATED APPLICATIONS

This application claims priority to Sweden Application No. 1651700-5, filed on Dec. 21, 2016, the disclosure of which is incorporated herein by reference in its entirety.

FIELD

The present invention relates to a method and system for controlling a drive signal in a fingerprint sensing device.

BACKGROUND

Various types of biometric systems are used more and more in order to provide for increased security and/or enhanced user convenience.

In particular, fingerprint sensing systems have been adopted in, for example, consumer electronic devices, thanks to their small form factor, high performance, and user acceptance.

Among the various available fingerprint sensing principles (such as capacitive, optical, thermal etc.), capacitive sensing is most commonly used, in particular in applications where size and power consumption are important issues.

All capacitive fingerprint sensors provide a measure indicative of the capacitance between each of several sensing structures and a finger placed on or moved across the surface of the fingerprint sensor.

One popular fingerprint detection methodology is based on an induced potential difference between a finger placed on the sensor and an underlying capacitive sensing structure. The potential difference may be induced by providing a time varying drive signal to the finger, to a common ground plane, to all or parts of the fingerprint sensor, and combinations thereof. Accordingly, this results in an electromagnetic environment influenced by a time varying potential.

Fingerprint sensors are integrated in an increasing range of various electronic devices which may comprise many different types of components. In some cases, the drive signal, which may be generated by the fingerprint sensor or by a separate device arranged along the fingerprint sensor, may disturb or interfere with the operation of other sensitive components.

Accordingly, there is a need to provide an improved method and system for providing a drive signal for a fingerprint sensing device.

SUMMARY

In view of above-mentioned and other drawbacks of the prior art, it is an object of the present invention to provide a method and a system for reducing the interference between a drive signal and components of an electronic device comprising a fingerprint sensing device.

According to a first aspect of the invention, there is provided a method for controlling a capacitive fingerprint sensing device for sensing a fingerprint pattern of a finger, the capacitive fingerprint sensor comprising a plurality of sensing elements. Each sensing element comprises a protective dielectric top layer to be touched by the finger, an electrically conductive sensing structure arranged underneath the top layer, sensing circuitry for providing an analog sensing signal indicative of a distance between the finger and the sensing structure. The fingerprint sensing device further comprises timing circuitry configured to control a timing of a drive signal, the drive signal being configured to provide a change in potential difference between the finger and the sensing structure. The method comprises forming a drive signal comprising a sequence of pulses, wherein a delay between consecutive pulses is controllable by said timing circuitry.

In the context of the present application, the term "potential" should be understood to mean "electrical potential". A change in potential difference should, accordingly, be understood to mean a time variable change in an electrical potential, in relation to a reference potential, between the finger and the sensing structure.

The sensing elements may advantageously be arranged in an array comprising rows and columns. Moreover, each sensing structure may advantageously be provided in the form of a metal plate, so that the equivalence of a parallel plate capacitor is formed by the sensing structure (the sensing plate), the local finger surface, and the protective dielectric top layer (and any air that may locally exist between the local finger surface and the protective layer, depending on location of ridges and valleys in the fingerprint pattern). A change of the charge carried by the sensing structure resulting from the change in potential difference between the finger and the sensing structure is an indication of the capacitance of such a parallel plate capacitor, which is in turn an indication of the distance between the sensing structure and the finger surface. Thereby, an image of the fingerprint pattern can be acquired by means of determining the capacitive coupling between each sensing structure and the finger.

The protective top layer, which also may be referred to as a coating, may advantageously be at least 20 µm thick and have a high dielectric strength to protect the underlying structures of the fingerprint sensing device from wear and tear as well as from ESD. Even more advantageously, the protective top layer may be approximately 100 µm thick. In some embodiments, the protective coating may be in the range of 500-700 µm thick, or even thicker. The protective top layer may also comprise a protective plate comprising a dielectric material in order to provide a good capacitive coupling between a finger placed on the plate and the sensing elements. In particular, the protective plate may advantageously comprise a glass or ceramic material, such as a chemically strengthened glass, ZrO2 or sapphire. The aforementioned materials all provide advantageous properties in that they are hard and thereby resistant to wear and tear, and in that they are dielectric thereby providing a good capacitive coupling between a finger placed on the surface of the protective plate and the sensing element of the sensing device. The fingerprint sensing device may also be arranged underneath a cover glass or a display glass of an electronic device.

Moreover, each sensing element may be controllable to perform a predetermined measurement sequence involving transitioning between different measurement states in a predetermined sequence. A measurement state may be defined by a certain combination of control signals provided to the circuitry comprised in the sensing element.

The drive signal circuitry may comprise switching circuitry configured to switch between two or more different potentials, to form the at least one drive pulse having a maximum voltage level and a minimum voltage level. Alternatively or in combination, the drive signal circuitry may comprise at least one controllable signal source configured to provide the time-varying excitation potential. In general terms, the drive signal circuitry comprises a controllable voltage source.

The timing circuitry may be included in a fingerprint sensor component, and may then provide a control signal for drive signal circuitry to provide a drive signal having a time-varying excitation potential in relation to a reference potential of the fingerprint sensor component, for example a sensor ground potential. It should also be noted that the timing circuitry and the drive signal circuitry may be arranged together in a single location, or they may be located separately. Moreover, in the case of circuitry providing the joint functionality of forming and providing a timing signal and forming and providing a drive signal, the terms drive signal circuitry and timing signal circuitry can be considered to be equivalent.

Accordingly, the timing circuitry and/or the drive signal circuitry may be provided externally to the fingerprint sensor component and be connected to the fingerprint sensor component to provide the drive signal as a time-varying reference potential for the fingerprint sensor component. In this case, the drive signal may exhibit its time-varying drive potential in relation to a device ground potential of the electronic device in which the fingerprint sensing system is included. External drive signal circuitry may be controlled using timing control signals generated by timing circuitry comprised in the fingerprint sensor component. The drive signal circuitry may also be referred to as excitation signal circuitry.

The present invention is based on the realization that a drive signal comprising a pulse train or a burst of pulses at a predetermined frequency may interfere with the operation of surrounding components, for example in an electronic device such as a smartphone. Thereby, the present invention relates to the formation of a drive signal comprising a controllable delay in between selected pulses in order to either change the frequency of the drive signal or to form a non-regular drive signal in order to reduce or eliminate interference occurring as a result of the drives signal.

According to one embodiment of the invention, the pulses may have a fixed duty cycle determining a minimum separation between consecutive pulses. A fixed duty cycle may for example be advantageous in applications where a sampling sequence for fingerprint sensing is fixed. Thereby, it can be ensured that the sampling sequence can be performed during a fixed duty cycle.

According to one embodiment of the invention, the drive signal may comprise a sequence of pulses arranged in groups of pulses, where a delay between consecutive groups of pulses is larger than a delay between consecutive pulses within a group, and wherein a delay between consecutive pulses is the same for all pulses within a group. Thereby, arbitrary pulse trains can be formed where both the group frequency as well as the frequency of pulses within a group can be controlled. An additional advantage of forming groups of pulses is that the overall power consumption is reduced in comparison with a continuous sequence of pulses.

According to one embodiment of the invention, the method may comprise providing a drive signal comprising a plurality of sequences of pulses, each sequence comprising a plurality of groups of pulses, and controlling a delay between consecutive sequences of pulses, wherein a delay between consecutive sequences is larger than a delay between consecutive groups. For certain use cases, such as when the fingerprint sensing device is in an idle mode and waiting to detect the presence of a finger, the power consumption can be reduced further by first defining a pulse sequence comprising groups of pulses, and by controlling a delay between consecutive sequences.

According to one embodiment of the invention, the method may comprise providing a random delay between consecutive pulses. By providing a random delay, where the delay for example may vary in the range of 1 to 20 clock cycles, a signal with no apparent frequency can be provided. Thereby, the risk that the drive signal interferes with another component in an electronic device is significantly reduced.

According to one embodiment of the invention a delay between consecutive pulses may be based on an operating frequency of a component in an electronic device in which the fingerprint sensing device is arranged. In order to ensure that interference is kept at a minimum, a frequency of the drive signal can be specifically selected based on an operating frequency of a component of an electronic device. Such a component may for example be a touch screen display. Assuming that the operating frequency of the component is known, the frequency of the drive signal can be selected to be different from the operating frequency.

According to one embodiment of the invention, the method may further comprise detecting the use of an antenna in an electronic device in which the fingerprint sensing device is arranged, and increasing a delay between consecutive pulses compared to if the antenna is not in use. When it comes to the use of an antenna in an electronic device such as a smart phone, it is not primarily the frequency of the drive signal which is responsible for disturbing the antenna, it is the total power output of the drive signal. Accordingly, by increasing a delay between pulses of the drive signal, the overall power output is reduced, thereby reducing the distortions in the antenna. In particular, the drive signal may have a certain configuration for a given operation mode of the fingerprint sensor, and when it is detected that an antenna of the phone is active, or is about to be activated, an additional delay can be introduced between consecutive pulses. However, it is also possible to provide a drive signal having a new configuration once the antenna use is detected, where the overall power content of the drive signal is reduced compared to when the antenna is not in use. The drive signal can be controlled in a similar manner also when the use of other components is detected.

According to a second aspect of the invention, there is provided a capacitive fingerprint sensing device for sensing a fingerprint pattern of a finger. The capacitive fingerprint sensing device comprises a plurality of sensing elements, with each sensing element comprising a protective dielectric top layer to be touched by the finger, an electrically conductive sensing structure arranged underneath the top layer, sensing circuitry for providing an analog sensing signal indicative of a distance between the finger and the sensing structure. The fingerprint sensing device further comprises timing circuitry configured to control a timing of a drive signal, the drive signal being configured to provide a change in potential difference between the finger and the sensing structure. Moreover, the timing circuitry is configured to form a drive signal comprising a sequence of pulses, wherein a delay between consecutive pulses is controllable by the timing circuitry.

Many of the effects and features of the second aspect of the invention are largely analogous to those described above in connection with the first aspect of the invention.

According to one embodiment of the invention, the sensing device may further comprise an electrically conductive bezel arranged adjacent to a sensing surface of the fingerprint sensing device, wherein the drive signal is provided to the bezel. Hereby, the drive signal can be introduced to the finger of a used when the finger is placed in the fingerprint sensing device such that a detectable change in potential difference is induced. The bezel refers to a conductive structure which is exposed at the sensing surface, and the bezel may for example comprise a metal frame fully or partially surrounding the sensing device.

According to one embodiment of the invention, the drive signal may be provided to a sensing element of said sensing circuitry. In particular, the drive signal may be connected to a positive input of a charge amplifier which is part of the sensing circuitry. Thereby, the change in potential difference can be induced by changing the potential of the sensing structure while the finger is grounded. The sensing circuitry will be described in the following detailed description.

According to one embodiment of the invention, the drive signal may be provided to a reference ground connection of said sensing circuitry. The drive signal may for example be connected to a common ground plane of the sensing circuitry such that the change in potential difference is induced by changing the potential of the common ground.

According to one embodiment of the invention the timing circuitry may comprise drive signal circuitry configured to form and provide the drive signal to the sensing circuitry. Hereby, the drive signal circuitry is considered to be part of the timing circuitry such that the timing circuitry both controls and forms the drive signal. As discussed above, the timing circuitry may be arranged integrated with the fingerprint sensing circuitry, or as a separate circuit.

According to one embodiment of the invention, there is provided an electronic device comprising a fingerprint sensing device according to any one of the above described embodiments. The electronic device further comprises a component operating at a predetermined operating frequency; wherein the timing circuitry is configured to form a drive signal comprising a delay between consecutive pulses based on the predetermined operating frequency.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing an example embodiment of the invention, wherein.

DETAILED DESCRIPTION OF EXAMPLE EMBODIMENTS

In the present detailed description, various embodiments of the system and method according to the present invention are mainly described with reference to a capacitive fingerprint sensing device arranged in a smartphone.

Figure 1:
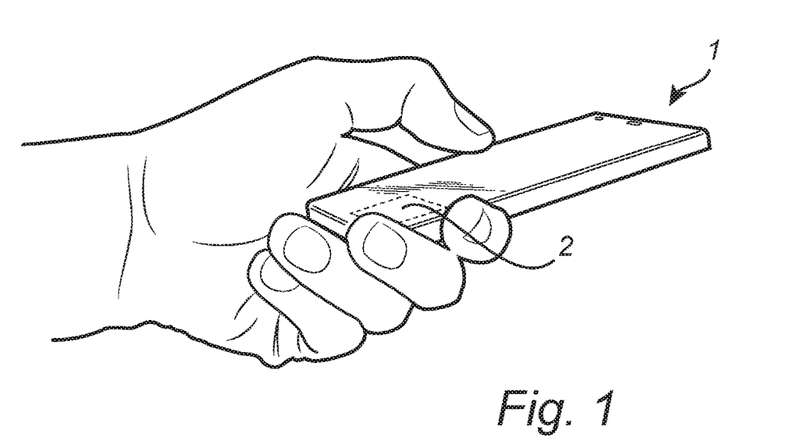
FIG. 1 schematically illustrates an application for a fingerprint sensing device according to an embodiment of the present invention.

FIG. 1 schematically illustrates an application for a fingerprint sensing device 2 according to an example embodiment of the present invention, in the form of a mobile phone 1 with an integrated fingerprint sensing device 2. The fingerprint sensing device 2 may, for example, be used for unlocking the mobile phone 1, for verifying the identity of a user and/or for authorizing transactions carried out using the mobile phone, etc. A fingerprint sensing device 2 according to various embodiments of the invention may also be used in other devices, such as tablet computers, laptops, smart cards or other types of consumer electronics.

Figure 2:
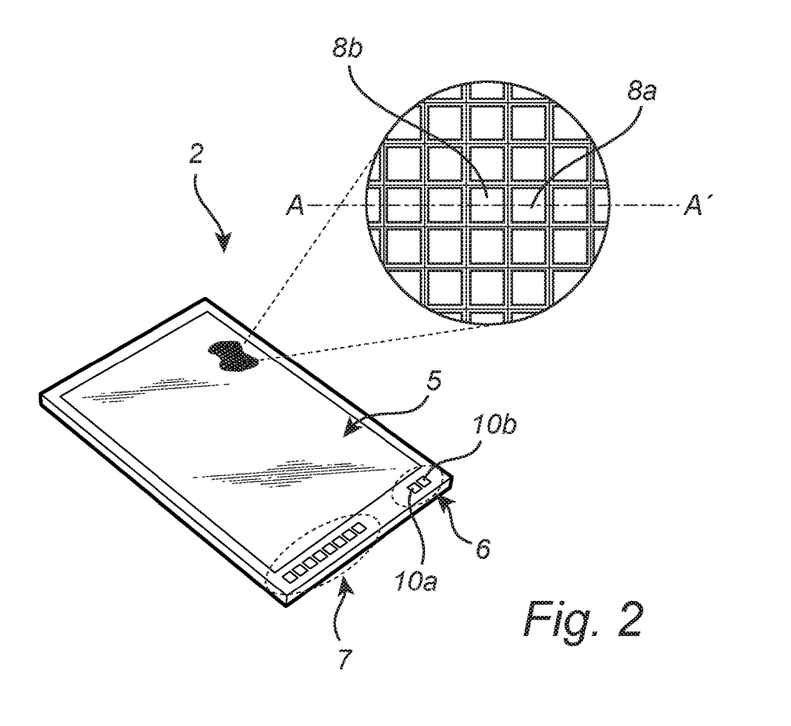
FIG. 2 schematically illustrates a fingerprint sensing device according to an embodiment of the invention.

FIG. 2 schematically shows the fingerprint sensing device 2 comprised in the mobile phone 1 in FIG. 1. As can be seen in FIG. 2, the fingerprint sensing device 2 comprises a sensor array 5, a power supply interface 6 and a communication interface 7. The sensor array 5 comprises a large number of sensing elements 8a-b (only two of the sensing elements have been indicated with a reference numeral to avoid cluttering the drawing), each being controllable to sense a distance between a sensing structure comprised in the sensing element 8a-b and the surface of a finger contacting the top surface of the sensor array 5.

The power supply interface 6 comprises first 10a and second 10b contact pads, here shown as bond pads, for connection of a supply voltage $V_{supply}$ to the fingerprint sensing device 2.

The communication interface 7 comprises a number of bond pads for allowing control of the fingerprint sensing device 2 and for acquisition of fingerprint data from the fingerprint sensing device 2. It should be noted that other types of communication and supply voltage connections are equally possible, such as via connections through the substrate.

Figure 3:
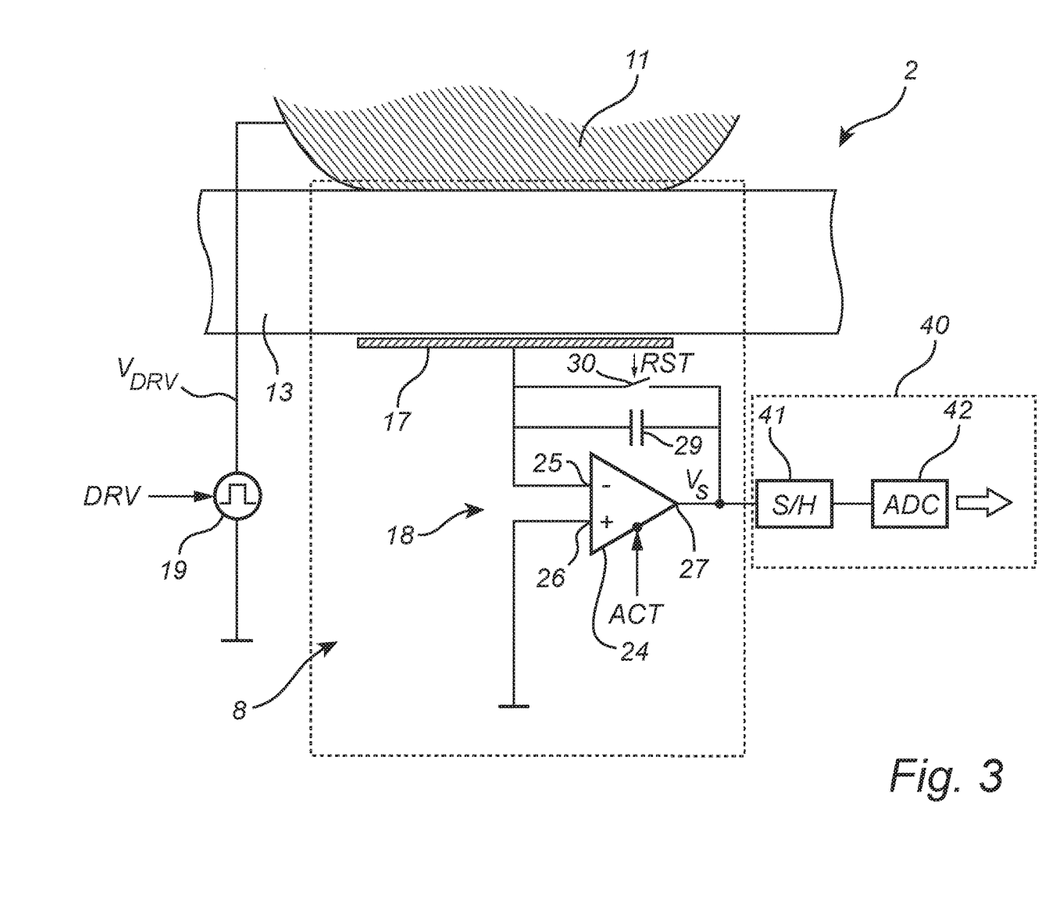
FIG. 3 is a schematic cross section and a circuit schematic of a portion of a fingerprint sensing device according to an embodiment of the invention.

FIG. 3 is a schematic cross section and a circuit schematic of a portion of a fingerprint sensing device 2 according to an embodiment of the invention, taken along the line A-A' as indicated in FIG. 2 with a finger 11 placed on top of the sensor array 5. The fingerprint sensing device comprises a plurality of sensing elements 8, each comprising a protective dielectric top layer 13 to be touched by the finger 11, an electrically conductive sensing structure 17, here in the form of a metal plate 17 underneath the protective dielectric top layer 13. The sensing element 8 further comprises sensing circuitry comprising a charge amplifier 18, and timing circuitry 19 for controlling and providing a drive signal $V_{DRV}$ to the finger as is schematically indicated in FIG. 3. In the present description, drive signal providing circuitry is considered to be included in the timing circuitry 19. The drive signal providing circuitry can for example comprise a controllable voltage source. As illustrated in FIG. 3, a ridge of the finger 11 is located directly above the sensing structure 17 indicating the minimum distance between the finger 11 and the sensing structure 17, as defined by the dielectric top layer 13.

The charge amplifier 18 comprises at least one amplifier stage, here schematically illustrated as an operational amplifier (op amp) 24 having a first input (negative input) 25 connected to the sensing structure 17, a second input (positive input) 26 connected to ground or to another reference potential, and an output 27. In addition, the charge amplifier 18 comprises a feedback capacitor 29 connected between the first input 25 and the output 27, and reset circuitry, here functionally illustrated as a switch 30, for allowing controllable discharge of the feedback capacitor 29. The charge amplifier 18 may be reset by operating the reset circuitry 30 to discharge the feedback capacitor 29.

As is often the case for an op amp 24 in a negative feedback configuration, the voltage at the first input 25 follows the voltage at the second input 26. Depending on the particular amplifier configuration, the potential at the first input 25 may be substantially the same as the potential at the second input 26, or there may be a substantially fixed offset between the potential at the first input 25 and the potential at the second input 26. In the configuration of FIG. 3, the first input 25 of the charge amplifier is virtually grounded.

When a time-varying potential is provided to the finger 11 by the drive signal providing circuitry 19, a corresponding time-varying potential difference occurs between the sensing structure 17 and the finger 11. The induced change in potential difference between the finger 11 and the sensing structure 17 in turn results in a sensing voltage signal Vs on the output 27 of the charge amplifier 18. The time-varying potential, $V_{DRV}$, may for example be provided to the finger via a bezel (not shown) in the form of an electrically conductive frame arranged around the fingerprint sensing surface.

Outside the sensing element 8, the block diagram in FIG. 3 illustrates readout circuitry 40 comprising a sample-and-hold circuit (S/H-circuit) 41 and an analog-to-digital converter (ADC) 42.

The readout circuitry 40 is connected to the output 27 of the charge amplifier 18 to receive and to sample the sensing signal Vs. The readout circuitry 40 may comprise, or be connected to, a control unit which controls the individual sample and hold (S&H) circuits comprised in the readout circuitry 40 to sample the sensing signal $V_s$ at the desired points in time with reference to the timing of a drive signal.

The sampling circuitry 41 is connected to an analog-to-digital converter 42 which is configured to convert analog sample into a digital sensing signal indicative of the capacitive coupling, and thereby of the distance, between the sensing structure 17 and the finger 11.

Moreover, it is also possible to share the sample-and-hold circuitry 41 and the ADC 42 between many different pixels by using multiplexers to connect a plurality of pixels to one sample-and-hold circuitry module 41. Accordingly, the output 27 of the charge amplifier 18, and/or the output sample-and-hold circuitry 41 may be connected to a multiplexer. For example, one sample-and-hold circuitry module 41 can be shared by one column of pixels.

Figure 4:
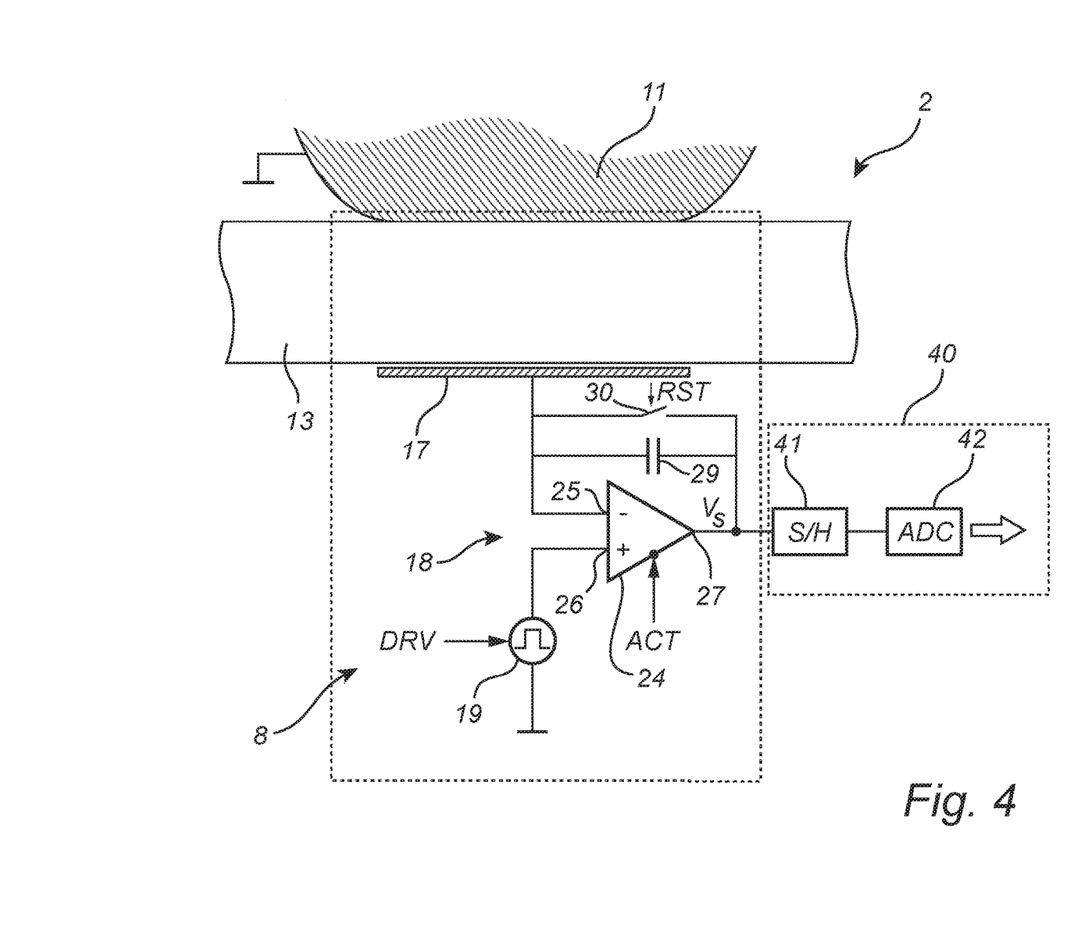
FIG. 4 is a schematic cross section and a circuit schematic of a portion of a fingerprint sensing device according to an embodiment of the invention.

FIG. 4 schematically illustrates a circuit schematic similarly to FIG. 3. The difference in FIG. 4 is that the timing circuitry 19 is connected to the second input 26 of the of the op amp 24. As discussed above, the potential of the first input 25 of the op amp 24 substantially follows the potential (i.e. voltage) of the second input 26 such that the drive signal provided by the timing circuitry 19 is in effect applied to the sensing structure 17. Thereby, the change in potential difference between the finger 11 and the sensing structure 17 is achieved by providing a drive signal to the second input 26 of the op amp 24.

Figure 5:
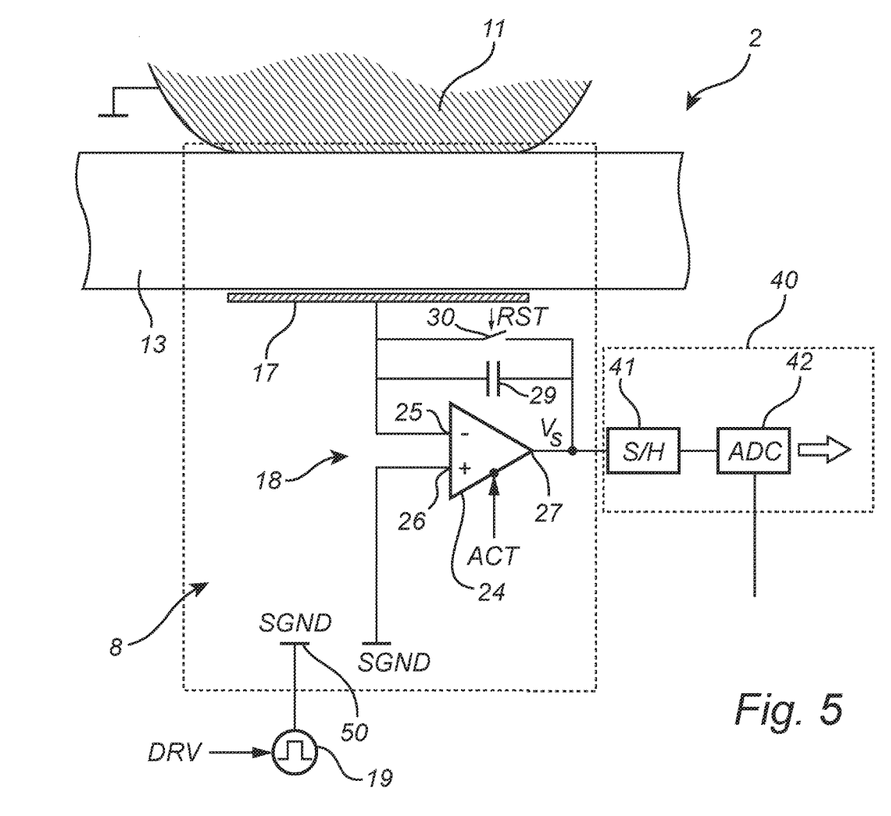
FIG. 5 is a schematic cross section and a circuit schematic of a portion of a fingerprint sensing device according to an embodiment of the invention.

Also FIG. 5 schematically illustrates a circuit schematic which is similar to FIG. 3. In FIG. 5, the timing circuitry 19 is connected to a reference ground connection 50 of the sensing device, referred to as SGND. Thereby, the change in potential difference between the finger 11 and the sensing structure 17 is achieved by providing a drive signal to the reference ground connection such that the ground potential of the sensing device follows the drive signal potential. It is also important to note that the finger 11 is separately grounded, meaning that the finger 11 does not share the ground connection with the sensing circuitry.

Figure 6A:
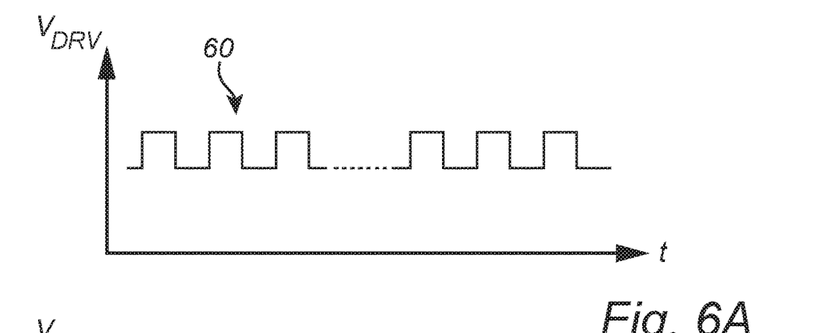
FIGS. 6A-E schematically illustrate drive signals according to example embodiments of the invention.

A drive signal having a fixed frequency is illustrated in FIG. 6A. As discussed above, it is desirable to provide the capability of forming a drive signal comprising a sequence of pulses, wherein a delay between consecutive pulses is controllable by the timing circuitry 19. The described method can equally well be seen as controllably inserting a delay between consecutive pulses in a sequence of pulses. In other words, the relevant feature is that a resulting drive signal having a controllable delay between consecutive pulses can be formed. Accordingly, the controllable delay may be formed in many different ways all within the scope of the present invention.

Moreover, the timing circuitry can be provided in various formed known by the skilled person. The timing circuitry may for example comprise a controllable clock, a state machine, a pulse generator and the like for forming the desired drive signal.

Figure 6B:
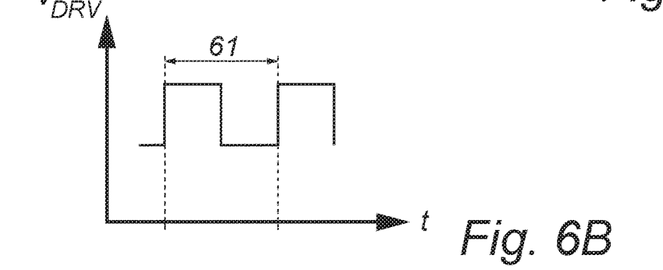

FIG. 6B illustrates a period 60 of a pulse having a duty cycle 61 of 50%. In an embodiment of the invention, the duty cycle 61 of the pulse is fixed, thereby determining a minimum separation between consecutive pulses as a half period. In such an embodiment, the delay between consecutive pulses is equal to a fixed number of half periods.

Figure 6C:
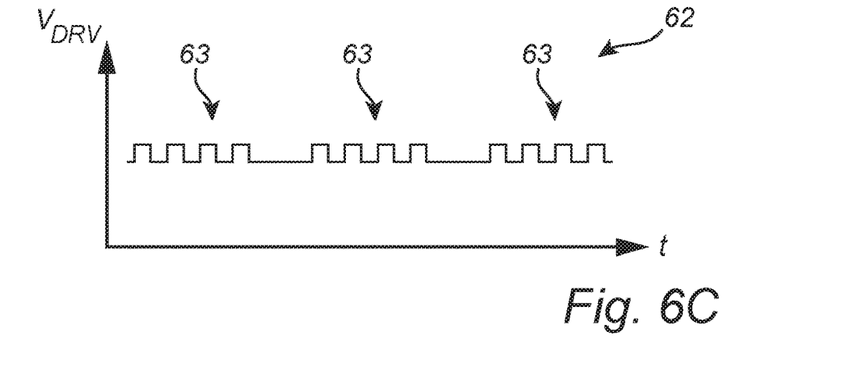

FIG. 6C schematically illustrates a drive signal, $V_{DRV}$, comprising a sequence 62 of pulses arranged in groups 63 of pulses. A delay between consecutive groups 63 of pulses is larger than a delay between consecutive pulses within a group 63, and a delay between consecutive pulses is the same for all pulses within a group 63. The groups 63 are here illustrated as comprising four pulses. However, a group of pulses may in principle comprise any number of pulses >1.

Figure 6D:
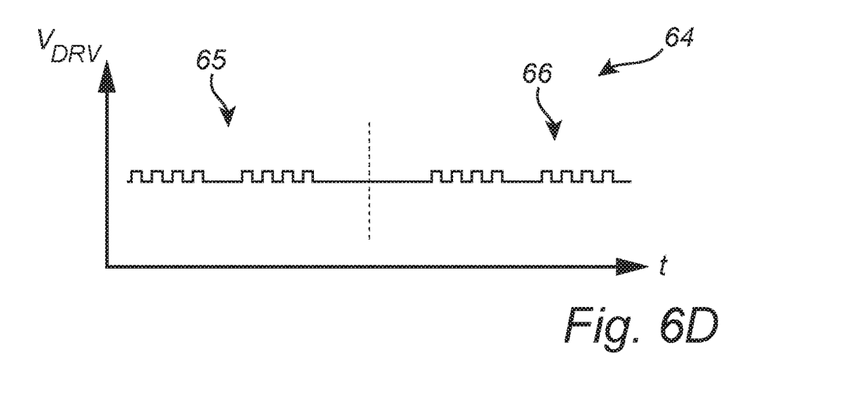

FIG. 6D schematically illustrates a drive signal 64, $V_{DRV}$, comprising a plurality of sequences of pulses 65, 66, each sequence comprising a plurality of groups of pulses 63. The delay between consecutive sequences of pulses is larger than a delay between consecutive groups.

In view of the above, the skilled person realizes that there are endless possibilities of forming combinations of sequences and groups of pulses such that a drive signal fulfilling the requirements of a particular application can be formed.

FIG. 6D schematically illustrates a drive signal 67, $V_{DRV}$, having a random delay between consecutive pulses, to prevent that the frequency of the drive signal coincides with resonance frequencies of other components in the electronic device. Thereby, the risk that a component is disturbed by the drive signal is reduced.

Figure 6E:
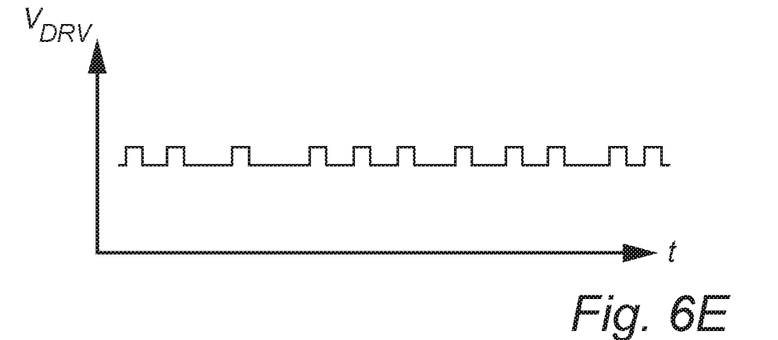

A delay between consecutive pulses can for example be selected to be in the range of 1 to 20 clock cycles, which is applicable both for pulse sequences having a random delay between consecutive pulses as illustrated in FIG. 6E, as well as for the examples illustrated in FIGS. 6C-D. In practice the time between consecutive pulses may range from microseconds, e.g. 1 µs up to about 100 ms.

Figure 7:
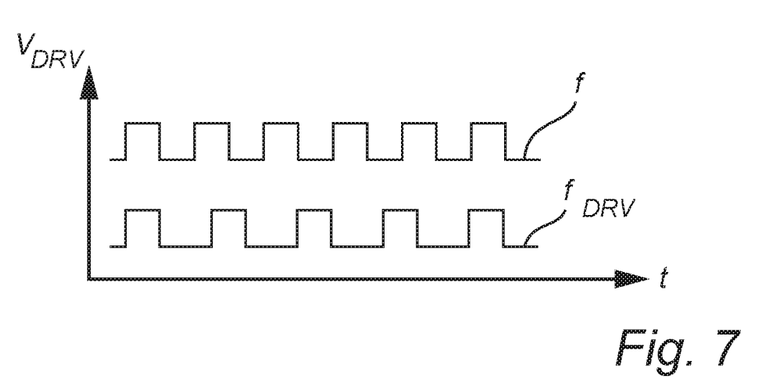
FIG. 7 schematically illustrates a drive signal according to an example embodiment of the invention.

FIG. 7 schematically illustrates an example where a frequency, $f_{DRV}$, of a drive signal is based on an operating frequency, f, of a component in an electronic device in which the fingerprint sensing device is arranged. In particular, the frequency $f_{DRV}$ of the drive signal drive $V_{DRV}$ is selected such that is does not coincide with the operating frequency f.

Figure 8A:
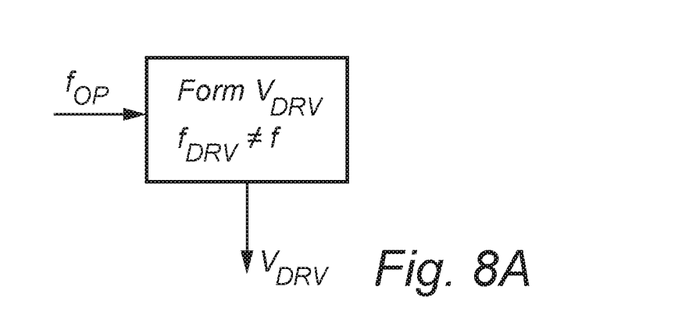
FIGS. 8A-B are block diagrams schematically illustrating functionalities of fingerprint sensing devices according to embodiments of the invention.

The functionality of forming a drive signal having a frequency which is different form an operating frequency of component is also outlined in the block diagram in FIG. 8A. It should also be noted that it is preferable that the frequency of the drive signal does not coincide with overtones of the operating frequency of the component.

The component may for example be a touch screen in a portable electronic device such as a smartphone or a tablet. The component may also be a microprocessor, integrated circuit or the like in a smart card. The fingerprint sensing device may comprise circuitry configured to detect the use of various other components in the electronic device, or the fingerprint sensing device may receive relevant information concerning use of such components from control circuitry of the electronic device.

Figure 8B:
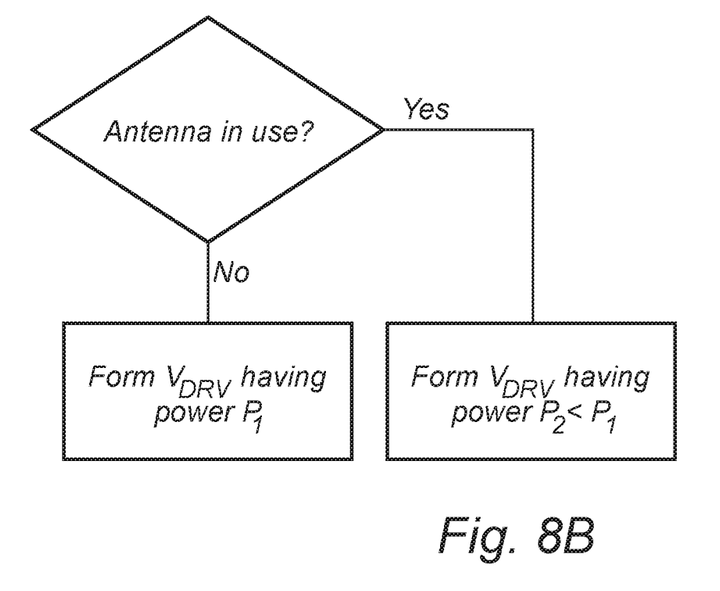

A fingerprint sensing device is often arranged in an electronic device having wireless communication functionality, thereby comprising one or more antennas for transmitting and/or receiving wireless signals. Such an antenna may also be disturbed by the drive signal in a fingerprint sensing device. In the case of an antenna, it is not primarily the frequency of the drive signal which influences the antenna, it is the overall power provided by the timing circuitry. Thereby, when the use of an antenna is detected, or when control circuitry provides information indicating that the antenna is about to be used, it is desirable to control the drive signal such the at the output power from the timing circuitry is reduced, as outlined by FIG. 8B. In particular, FIG. 8B illustrates that an output power $P_1$ of the timing circuitry used when the antenna is inactive such that the output power $P_2$ when the antenna is active is lower than $P_1$.

Moreover, it has been observed that a circuit layout where the drive signal is provided to a bezel, as discussed in relation to FIG. 3, is more likely to disturb the operation of a touch display arranged adjacent to the bezel. In comparison, a circuit layout where the drive signal is provided to a reference ground level of the fingerprint sensing device, as discussed in relation to FIG. 5, has more influence on the operation of the antenna.

Even though the invention has been described with reference to specific exemplifying embodiments thereof, many different alterations, modifications and the like will become apparent for those skilled in the art. Also, it should be noted that parts of the system and method may be omitted, interchanged or arranged in various ways, the system and method yet being able to perform the functionality of the present invention.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A method for controlling a capacitive fingerprint sensing device for sensing a fingerprint pattern of a finger, said capacitive fingerprint sensing device comprising a plurality of sensing elements, each sensing element comprising:
   a protective dielectric top layer to be touched by said finger;
   an electrically conductive sensing structure arranged underneath said top layer;
   sensing circuitry configured to provide an analog sensing signal indicative of a distance between said finger and said sensing structure, said fingerprint sensing device further comprising:
   timing circuitry configured to control a timing of a drive signal, the drive signal being configured to provide a change in potential difference between the finger and the sensing structure; the method comprising:
   forming a drive signal comprising a sequence of pulses, wherein a delay between consecutive pulses is controllable by said timing circuitry.

2. The method according to claim 1, wherein the pulses have a fixed duty cycle determining a minimum separation between consecutive pulses.

3. The method according to claim 1, wherein the drive signal comprises a sequence of pulses arranged in groups of pulses, where a delay between consecutive groups of pulses is larger than a delay between consecutive pulses within a group, and wherein a delay between consecutive pulses is the same for all pulses within a group.

4. The method according to claim 3, comprising providing a drive signal comprising a plurality of sequences of pulses, each sequence comprising a plurality of groups of pulses, and controlling a delay between consecutive sequences of pulses, wherein a delay between consecutive sequences is larger than a delay between consecutive groups.

5. The method according to claim 1, comprising providing a random delay between consecutive pulses.

6. The method according to claim 1, wherein a delay between consecutive pulses is in the range of 1 to 20 clock cycles.

7. The method according to claim 1, wherein a delay between consecutive pulses is based on an operating frequency of a component in an electronic device in which the fingerprint sensing device is arranged.

8. The method according to claim 7, wherein a fixed delay is provided between consecutive pulses such that said drive signal is characterized by a frequency different from the operating frequency.

9. The method according to claim 7, wherein the component is a touch screen display of an electronic device.

10. The method according to claim 1, further comprising detecting the use of an antenna in an electronic device in which the fingerprint sensing device is arranged, and increasing a delay between consecutive pulses compared to if the antenna is not in use.

11. A capacitive fingerprint sensing device for sensing a fingerprint pattern of a finger, said capacitive fingerprint sensing device comprising a plurality of sensing elements, each sensing element comprising:
   a protective dielectric top layer to be touched by said finger;
   an electrically conductive sensing structure arranged underneath said top layer;
   sensing circuitry configured to provide an analog sensing signal indicative of a distance between said finger and said sensing structure, said fingerprint sensing device further comprising:

timing circuitry configured to control a timing of a drive signal, the drive signal being configured to provide a change in potential difference between the finger and the sensing structure;

wherein the timing circuitry is configured to form a drive signal comprising a sequence of pulses, wherein a delay between consecutive pulses is controllable by said timing circuitry.

12. The sensing device according to claim 11, further comprising an electrically conductive bezel arranged adjacent to a sensing surface of said fingerprint sensing device, wherein said drive signal is provided to said bezel.

13. The sensing device according to claim 11, wherein said drive signal is provided to a sensing element of said sensing circuitry.

14. The sensing device according to claim 11, wherein said drive signal is provided to a reference ground connection of said sensing circuitry.

15. The sensing device according to claim 11, wherein said timing circuitry comprises drive signal circuitry configured to form and provide said drive signal to said sensing circuitry.

16. An electronic device comprising:
a fingerprint sensing device according to claim 11; and
a component operating at a predetermined operating frequency; wherein the timing circuitry is configured to form a drive signal comprising a delay between consecutive pulses based on the predetermined operating frequency.

17. The electronic device according to claim 16, wherein the timing circuitry is configured to configured to form a drive signal comprising a fixed delay between consecutive pulses such that said drive signal exhibits a fixed frequency different from the operating frequency.

18. The electronic device according to claim 16, wherein the timing circuitry is configured to form a drive signal comprising a random delay between consecutive pulses.

19. The electronic device according to claim 17, further comprising an antenna, wherein the fingerprint sensing device is configured to detect a use of the antenna, and to increase a delay between consecutive pulses compared to if the antenna is not in use.

* * * * *